(12) United States Patent
Wheeler

(10) Patent No.: US 6,305,743 B1
(45) Date of Patent: Oct. 23, 2001

(54) PNEUMATIC BICYCLE SEAT ASSEMBLY

(76) Inventor: Kelly Wheeler, P.O. Box 1807, Whitefish, MT (US) 59937

(*) Notice: Subject to any disclaimer, the term of this patent is extended or adjusted under 35 U.S.C. 154(b) by 0 days.

(21) Appl. No.: 09/418,048

(22) Filed: Oct. 13, 1999

Related U.S. Application Data

(60) Provisional application No. 60/103,695, filed on Oct. 9, 1998.

(51) Int. Cl.⁷ ........................................................ B62J 1/26
(52) U.S. Cl. ............................ 297/199; 297/200; 297/215
(58) Field of Search ................................ 297/199, 200, 297/215, 195.1

(56) References Cited

U.S. PATENT DOCUMENTS

| | | | |
|---|---|---|---|
| 595,111 | * 12/1897 | Perry | 297/199 |
| 1,518,157 | * 12/1924 | Linder | 297/215 X |
| 4,504,089 | * 3/1985 | Calvert et al. | 297/200 X |
| 5,938,277 | * 9/1999 | Rioux et al. | 297/199 |

FOREIGN PATENT DOCUMENTS

| | | | |
|---|---|---|---|
| 606076 | * 6/1926 | (FR) | 297/199 |
| 409951 | * 3/1945 | (IT) | 297/199 |

* cited by examiner

Primary Examiner—Laurie K. Cranmer

(57) ABSTRACT

The pneumatic bicycle seat assembly of the present invention has an exterior covering, a bracket being a rod of suitable size bent at the center to form an eye, with each of two leg portions extending rearward in mirror image fashion. A base attaches to and rests on top of the bracket. A pneumatic bladder is a self-enclosed element which is separate from and disposed between the base and the soft, flexible cover. An external valve and a pneumatic pump cooperate to both inflate and deflate the pneumatic bladder.

6 Claims, 2 Drawing Sheets

PNEUMATIC BICYCLE SEAT ASSEMBLY

This application claims the benefits under 35 U.S.C. 119(c) of previously filed provisional application, Ser. No. 60/103,695 filed Oct. 9, 1998.

BACKGROUND OF THE INVENTION

1. Field of Invention

The present invention relates to bicycle seat assembly's, and more particularly to a pneumatic bicycle seat assembly.

2. Description of the Related Art

Over the past several years, bicycling has regained popularity. Despite such gain and the plethora of improvements in bicycling apparatus, a comfortable bicycle seat remains absent. Many attempts have focused on the bicycle seat with pneumatic seats appearing to be the most promising improvement. But, current designs and apparatus are found to be still be deficient.

Examples of pneumatic bicycle seats are U.S. Pat. No. 5,524,961 to Howard, U.S. Pat. No. 5,330,249 to Weber et al., U.S. Pat. No. 5,280,993 Heh, and U.S. Pat. No. 5,244,251 to Bouria. Additionally, U.S. Pat. No. 4,611,851 to Noyes et al., discloses a rotocasted or injection molded hollow saddle pneumatic seat.

There exists a need for a pneumatic bicycle seat that conforms to and supports the anatomical shape of either male or female bicyclists and that is uncomplicated to manufacture. Such a pneumatic bicycle seat is not yet found in the art. The present invention substantially fulfills this need.

It is therefore, the general purpose of the instant invention to provide a new, improved pneumatic bicycle seat assembly which is simple, practicle and economic to manufacture, employ and maintain.

The pneumatic bicycle seat of the present invention substantially departs from the conventional concepts, design and complications of the prior art, and in doing so provides an apparatus primarily developed for the purpose of providing an improved pneumatic bicycle seat which is simple, practical and economic to manufacture, employ and maintain. The prior patents and commercial techniques do not suggest the simple inventive combination of component elements arranged and configured as disclosed and claimed herein.

SUMMARY OF THE INVENTION

The present invention relates to an improved pneumatic bicycle seat assembly adapted for use with a standard bicycle seat post and is defined by the appended claims with the specific embodiment shown in the attached drawings. The pneumatic bicycle seat assembly has an exterior covering which is in contact with the seated bicyclist and is a soft, flexible leather, lycra, or other suitable durable material. The exterior covering is sewn together to fit over the other components of the pneumatic bicycle seat assembly. The exterior covering has an opening in the bottom through which the bicycle post attachment member can be placed for attachment to the base of the pneumatic bicycle seat assembly.

The pneumatic bicycle seat assembly has a bracket located on the bottom thereof. The bracket provides for attachment of the pneumatic bicycle seat assembly to the bicycle post attachment member. For purposes of this description, front and rear, and up and down, will be with reference to the position of the pneumatic bicycle seat assembly when the same is attached to and properly positioned on a bicycle. The bracket is a rod of suitable size bent at the center to form an eye, with each of the two leg portions extending rearward from the eye in mirror image fashion. As the two leg portions extend along their length rearward from the eye, they slightly separate from each other, commencing such separation at the eye. As the two leg portions extend along their length from the eye, they are angled downward at a first bend and outward from each other at a second bend. As the two leg portions further extend along their length from the eye, past the second bend, they are angled upward at a third bend. The angle at the first bend and the angle at the third bend result in the eye of the bracket being positioned slightly lower than the first bend and the bracket sloping slightly downward from the first bend to the eye. As the two leg portions extend further along their length from the eye, past the third bend, they are angled severely upward in a 180 degree angle at a fourth bend. The fourth bend results in the two leg portions being bent back over themselves in a vertical fashion. As the two leg portions extend further along their length from the eye, past the fourth bend, they are angled severely outward in a second 180 degree angle at fifth bend.

The pneumatic bicycle seat assembly has a base. The base is of plastic, nylon or other sturdy material. The base securely attaches to the bracket and rests on top of the bracket. The front of the base has a cushion, which cushion extends from the very front portion of the base to the front portion of a hold down bracket.

The pneumatic bicycle seat assembly has a pneumatic bladder, which pneumatic bladder is a one piece self-enclosed element which is separate from and disposed between the base and the exterior covering such that the pneumatic bladder adjustably supports the ischial tuberosity bones and surrounding muscle and tissue and avoids the perineum tissue of the bicyclist. The pneumatic bladder is covered and secured to the base by means of the hold-down bracket which extends through the exterior covering and the base. The pneumatic bladder is secured to the base and covered and further secured on the base by means of the exterior covering. The pneumatic bladder has an enclosed hollow chamber generally divided into two compartments with passage for air therebetween. The pneumatic bladder has securely attached to a rear portion thereof an external valve. In another embodiment, the pneumatic bladder comprises two enclosed hollow chambers each having an external valve securely attached to a rear portion thereof and providing for no air passage therebetween. The external valve and a pneumatic pump cooperate to both inflate and deflate the pneumatic bladder.

Therefore, it is an object of the present invention to provide a new, improved pneumatic bicycle seat assembly which is simple and of a reasonable cost to manufacture, maintain and replace, which is of durable and reliable construction, and which is economically available to the buying public.

BRIEF DESCRIPTION OF THE DRAWINGS

In order that the new and improved pneumatic bicycle seat assembly of the present invention will be better understood and readily carried into effect, a preferred embodiment will now be described by way of example only, with reference to the accompanying drawings wherein.

DESCRIPTION OF THE PREFERRED EMBODIMENT

Figure 1:
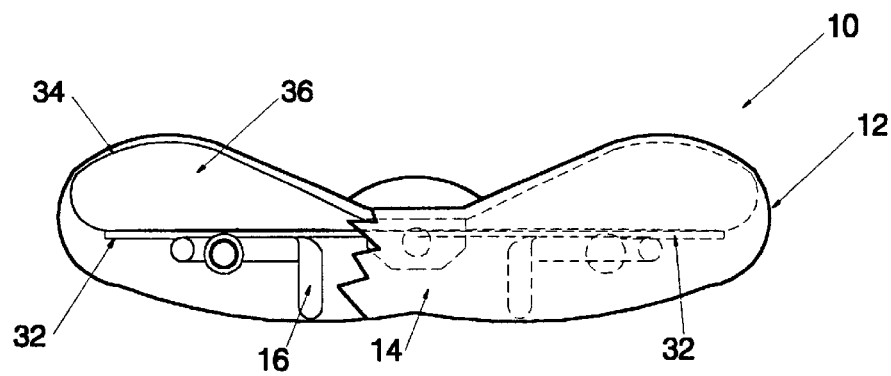
FIG. 1 is a perspective view of the pneumatic bicycle seat assembly of the present invention showing the exterior covering over the components.
Figure 2:
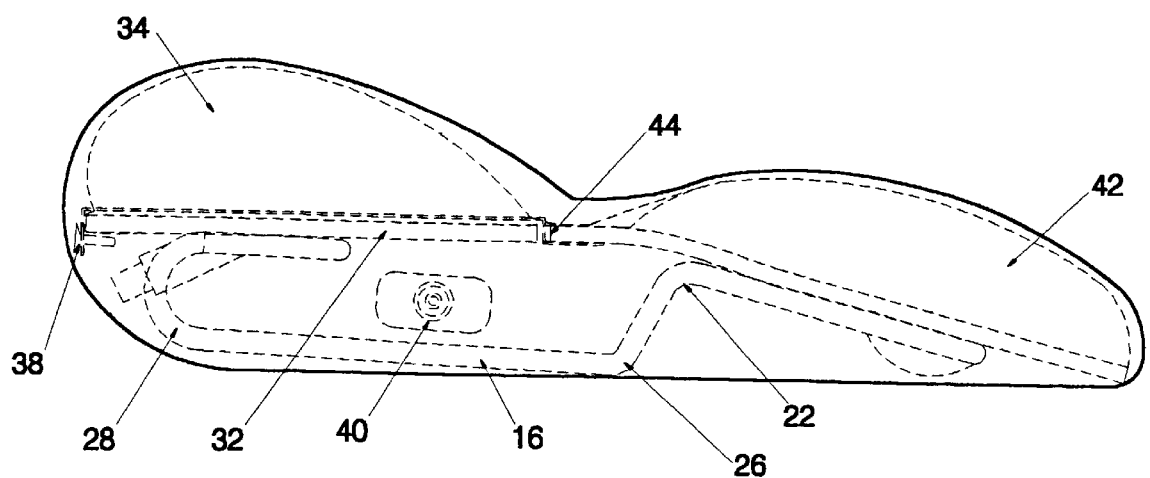
FIG. 2 is an expanded view of the pneumatic bicycle seat assembly of the present invention showing the components thereof with the pneumatic bladder having two enclosed hollow chambers.
Figure 3:
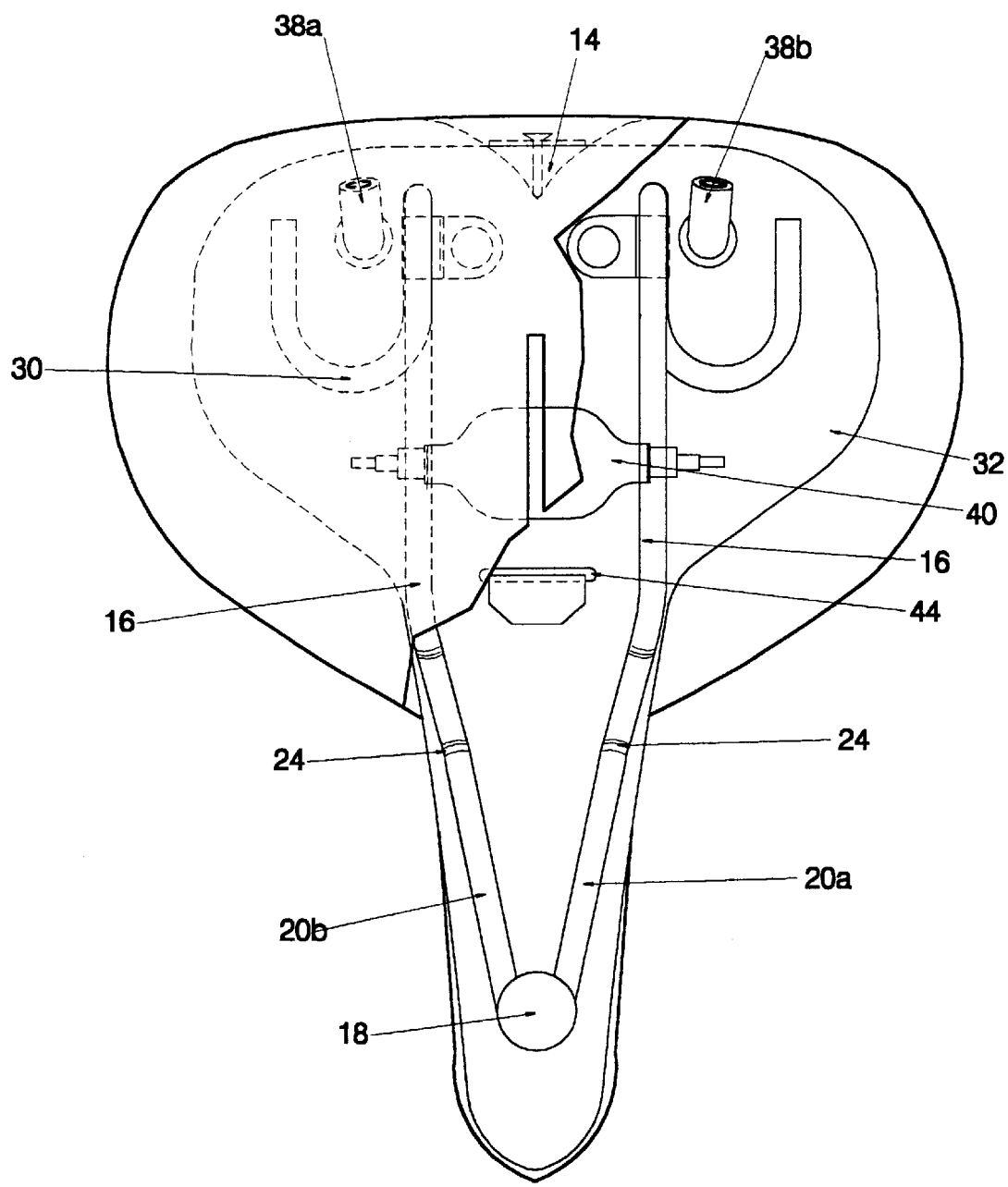
FIG. 3 is an expanded view of the pneumatic bicycle seat assembly of the present invention showing the components thereof with the pneumatic bladder having one enclosed hollow chamber.

With reference now to the drawings, and as shown in FIGS. 1 through 3 thereof. preferred embodiments of the pneumatic bicycle seat assembly 10 embodying the principals and concepts of the present invention are shown.

The pneumatic bicycle seat assembly 10 has an exterior covering 12 which is in contact with the seated bicyclist and is a soft, flexible leather, lycra, or other suitable durable material. The exterior covering 12 is sewn together to fit over the other components of the pneumatic bicycle seat assembly 10. The exterior covering 12 has an opening 14 in the bottom through which the bicycle post attachment member (not shown) can be placed for attachment to the base of the pneumatic bicycle seat assembly 10.

The pneumatic bicycle assembly 10 has a bracket 16 located on the bottom thereof. The bracket 16 provides for attachment of the pneumatic bicycle seat assembly 10 to the bicycle post attachment member. For purposes of this description, front and rear, and up and down, will be with reference to the position of the pneumatic bicycle seat assembly 10 when the same is attached to and properly positioned on a bicycle. The bracket 16 is a rod of suitable size bent at the center to form an eye 18, with each of the two leg portions 20a, 20b extending rearward from the eye 18 in mirror image fashion. As the two leg portions 20a, 20b extend along their length rearward from the eye 18, they slightly separate from each other, commencing such separation at the eye 18. As the two leg portions 20a, 20b extend along their length from the eye 18, they are angled downward at a first bend 22 and outward from each other at a second bend 24. As the two leg portions 20a, 20b further extend along their length from the eye 18, past the second bend 24, they are angled upward at a third bend 26. The angle at the first bend 22 and the angle at the third bend 26 result in the eye 18 of the bracket 16 being positioned slightly lower than the first bend 22 and the bracket 16 sloping slightly downward from the first bend 22 to the eye 18. As the two leg portions 20a, 20b extend further along their length from the eye 18, past the third bend 26, they are angled severely upward in a 180 degree angle at a fourth bend 28. The fourth bend 28 results in the two leg portions 20a, 20b being bent back over themselves in a vertical fashion. As the two leg portions 20a, 20b extend further along their length from the eye 18, past the fourth bend 28, they are angled severely outward in a second 180 degree angle at fifth bend 30.

The pneumatic bicycle seat assembly 10 has a base 32. The base 32 is of plastic, nylon, or other sturdy material. The base 32 securely attaches to the bracket 16 and rests on top of the bracket 16. The front of the base 32 has a cushion 42, which cushion 42 extends from the very front portion of the base 32 to the front portion of a hold down bracket 44.

The pneumatic bicycle seat assembly 10 has a pneumatic bladder 34, which pneumatic bladder 34 is a one piece self-enclosed element which is separate from and disposed between the base 32 and the exterior covering 12 such that the pneumatic bladder 34 adjustably supports the ischial tuberosity bones and surrounding muscle and tissue and avoids the perineum tissue of the bicyclist. The pneumatic bladder 34 is covered and secured to the base 32 by means of the hold-down bracket 44 which extends through the exterior covering 12 and the base 32. The pneumatic bladder 34 is secured to the base 32 and covered and further secured on the base 32 by means of the exterior covering 12. The pneumatic bladder 34 has an enclosed hollow chamber 36 generally divided into two compartments with passage for air therebetween. The pneumatic bladder 34 has securely attached to a rear portion thereof an external valve 38. In another embodiment, the pneumatic bladder 34 comprises two enclosed hollow chambers each having an external valve 38a, 38b securely attached to a rear portion thereof and providing for no air passage therebetween. The external valve 38 and a pneumatic pump 40 cooperate to both inflate and deflate the pneumatic bladder 34.

As to the manner of usage and operation of the pneumatic bicycle seat assembly 10 of the present invention, the same should be apparent from the above description.

With respect to the above description then, it is to be realized that the optimum dimensional relationship for the parts of the invention, to include variations in size, materials, shape, form, functions and manner of operation, assembly and use are deemed readily apparent and obvious to one skilled in the art, and all equivalent relationships to those illustrated in the drawings and described in the specification are intended to be encompassed by the present invention.

Therefore. the foregoing is considered as illustrative only of the principles of the invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. As such, the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

While particular embodiments of the invention have been shown and described, it will be understood that the invention is not limited thereto, since modifications may be made that will become apparent to those skilled in the art.

What is claimed is:

1. A pneumatic bicycle seat assembly, comprising:

an exterior covering, said exterior covering being soft and flexible;

said exterior covering being sewen together;

said exterior covering having an opening through which a bicycle post attachment member can be placed for attachment;

a bracket, said bracket providing for attachment of said pneumatic bicycle seat assembly to said bicycle post attachment member;

said bracket being a rod of suitable size bent at the center to form an eye;

said bracket having two leg portions extending rearward from said eye in mirror image fashion;

said two leg portions extending lengthwise rearward from said eye and separating from each other, commencing such separation at said eye;

said two leg portions being angled downward at a first bend;

said two leg portions being angled outward from each other at a second bend;

said two leg portions being angled upward at a third bend;

said first bend and said third bend resulting in said eye of said bracket being positioned slightly lower than said first bend and said bracket sloping slightly downward from said first bend to said eye;

said two leg portions being angled severely upward in a 180 degree angle at a fourth bend;

said fourth bend resulting in said two leg portions being bent back over themselves in a vertical fashion;

said two leg portions being angled severely outward in a second 180 degree angle at a fifth bend;

a base, said base being of plastic, nylon, or other sturdy material;

said base securely attaching to said bracket and resting on top of said bracket;

said base having a cushion, which cushion extends from the very front portion of the base to a front portion of a hold down bracket;

a pneumatic bladder, said pneumatic bladder being a one piece self-enclosed element which is separate from and disposed between said base and said exterior covering;

said pneumatic bladder being covered and secured to said base by means of said hold down bracket extending through said exterior covering and said base;

said pneumatic bladder being covered by means of said exterior covering;

said pneumatic bladder having an enclosed hollow chamber;

said pneumatic bladder having securely attached to a rear portion thereof an external valve;

a pneumatic pump; and, said external valve and said pneumatic pump cooperating to both inflate and deflate said pneumatic bladder.

2. The pneumatic bicycle seat assembly of claim 1 further comprising said exterior covering being flexible leather, lycra, or other suitable durable material.

3. The pneumatic bicycle seat assembly of claim 1 further comprising said base being plastic, nylon, or other sturdy material.

4. The pneumatic bicycle seat assembly of claim 1 further comprising said pneumatic bladder being a single compartment.

5. The pneumatic bicycle seat assembly of claim 1 further comprising said pneumatic bladder being divided into two compartments with passage for air therebetween.

6. The pneumatic bicycle seat assembly of claim 1 further comprising said pneumatic bladder having two enclosed hollow chambers, which each enclosed hollow chamber having an external valve securely attached to a rear portion thereof and providing for no air passage between said enclosed chambers.

* * * * *